United States Patent
Lee

(10) Patent No.: US 9,047,797 B2
(45) Date of Patent: Jun. 2, 2015

(54) IMAGE DISPLAY APPARATUS AND METHOD FOR OPERATING THE SAME

(75) Inventor: Jaejun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 373 days.

(21) Appl. No.: 13/556,424

(22) Filed: Jul. 24, 2012

(65) Prior Publication Data

US 2013/0076735 A1   Mar. 28, 2013

(30) Foreign Application Priority Data

Sep. 27, 2011 (KR) .................. 10-2011-0097735

(51) Int. Cl.
*G09G 3/00* (2006.01)
*H04N 13/00* (2006.01)
*H04N 13/04* (2006.01)

(52) U.S. Cl.
CPC ........... *G09G 3/003* (2013.01); *H04N 13/0022* (2013.01); *H04N 13/0402* (2013.01); *H04N 13/0475* (2013.01); *H04N 13/0477* (2013.01); *H04N 13/0479* (2013.01); *H04N 13/0481* (2013.01); *G09G 2354/00* (2013.01)

(58) Field of Classification Search
USPC ............... 348/51, 159, 143, 207.1, 42, 46
See application file for complete search history.

(56) References Cited

U.S. PATENT DOCUMENTS

| | | | |
|---|---|---|---|
| 7,511,730 B2 * | 3/2009 | Kondo et al. | 348/42 |
| 2004/0090523 A1 * | 5/2004 | Kondo et al. | 348/46 |
| 2011/0032252 A1 * | 2/2011 | Ohta | 345/419 |
| 2011/0221866 A1 * | 9/2011 | Ohta | 348/46 |
| 2012/0154538 A1 * | 6/2012 | Hasegawa et al. | 348/46 |

* cited by examiner

*Primary Examiner* — Paulos M Natnael
(74) *Attorney, Agent, or Firm* — KED & Associates, LLP

(57) ABSTRACT

An image display apparatus and a method for controlling the same are provided. The method includes displaying at least one of a left-eye object or a right-eye object when the image display apparatus has entered a 3-dimensional (3D) mode, displaying a movement amount object indicating the amount of movement of pixel arrangement of the at least one of the left-eye object or the right-eye object, receiving a pixel arrangement movement amount input through the movement amount object, and changing at least one pixel of the displayed left-eye object to a pixel of the right-eye object and displaying the changed pixel or changing at least one pixel of the displayed right-eye object to a pixel of the left-eye object and displaying the changed pixel according to the pixel arrangement movement amount input. This increases user convenience when stereoscopic images are displayed in an autostereoscopic manner.

16 Claims, 17 Drawing Sheets

IMAGE DISPLAY APPARATUS AND METHOD FOR OPERATING THE SAME

CROSS-REFERENCE TO RELATED APPLICATION

This application claims the benefit of Korean Application No. 10-2011-0097735, filed on Sep. 27, 2011 in the Korean Intellectual Property Office, the disclosure of which is incorporated herein by reference.

BACKGROUND OF THE INVENTION

1. Field of the Invention

The present invention relates to an image display apparatus and a method for operating the same, and more particularly to an image display apparatus and a method for operating the same which can improve user convenience when displaying stereoscopic images in an autostereoscopic (glasses-free) manner.

2. Description of the Related Art

An image display apparatus is a device having a function to display an image that can be viewed by the user.

Various methods for displaying 3D images are under discussion and studies are being conducted into autostereoscopic 3D displays.

SUMMARY OF THE INVENTION

Therefore, the present invention has been made in view of the above problems, and it is an object of the present invention to provide an image display apparatus and a method for operating the same which can improve user convenience when displaying stereoscopic images in an autostereoscopic manner.

It is another object of the present invention to provide an image display apparatus and a method for operating the same which allow the user to view optimal 3D images when viewing the 3D images in an autostereoscopic manner.

A method for operating an image display apparatus according to an embodiment of the present invention in order to achieve the above objects includes displaying at least one of a left-eye object or a right-eye object when the image display apparatus has entered a 3-dimensional (3D) mode, displaying a movement amount object indicating the amount of movement of pixel arrangement of the at least one of the left-eye object or the right-eye object, receiving a pixel arrangement movement amount input through the movement amount object, and changing at least one pixel representing the left-eye object to a pixel representing the right-eye object and displaying the changed pixel or changing at least one pixel representing the right-eye object to a pixel representing the left-eye object and displaying the changed pixel according to the pixel arrangement movement amount input.

A method for operating an image display apparatus according to another embodiment of the present invention in order to achieve the above objects includes displaying at least one of a left-eye object or a right-eye object when the image display apparatus has entered a 3-dimensional (3D) mode, receiving a movement input for moving an image arrangement reference coordinate of at least one of the left-eye object or the right-eye object, and rearranging and displaying the at least one of the left-eye object or the right-eye object according to a movement amount of the movement input.

An image display apparatus according to another embodiment of the present invention in order to achieve the above objects includes a display to display at least one of a left-eye object or a right-eye object when the image display apparatus has entered a 3-dimensional (3D) mode and to display a movement amount object indicating the amount of movement of pixel arrangement of the at least one of the left-eye object or the right-eye object, a user interface unit to receive a pixel arrangement movement amount input through the movement amount object, and a controller to perform a control operation for changing at least one pixel representing the left-eye object to a pixel representing the right-eye object or changing at least one pixel representing the right-eye object to a pixel representing the left-eye object and displaying the changed pixel according to the pixel arrangement movement amount input.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

The words "module" or "unit", which are appended to terms describing components, are merely used for ease of explanation of the present invention and have no specific meaning or function with respect to the components. Thus, the words "module" and "unit" may be used interchangeably.

Figure 1:
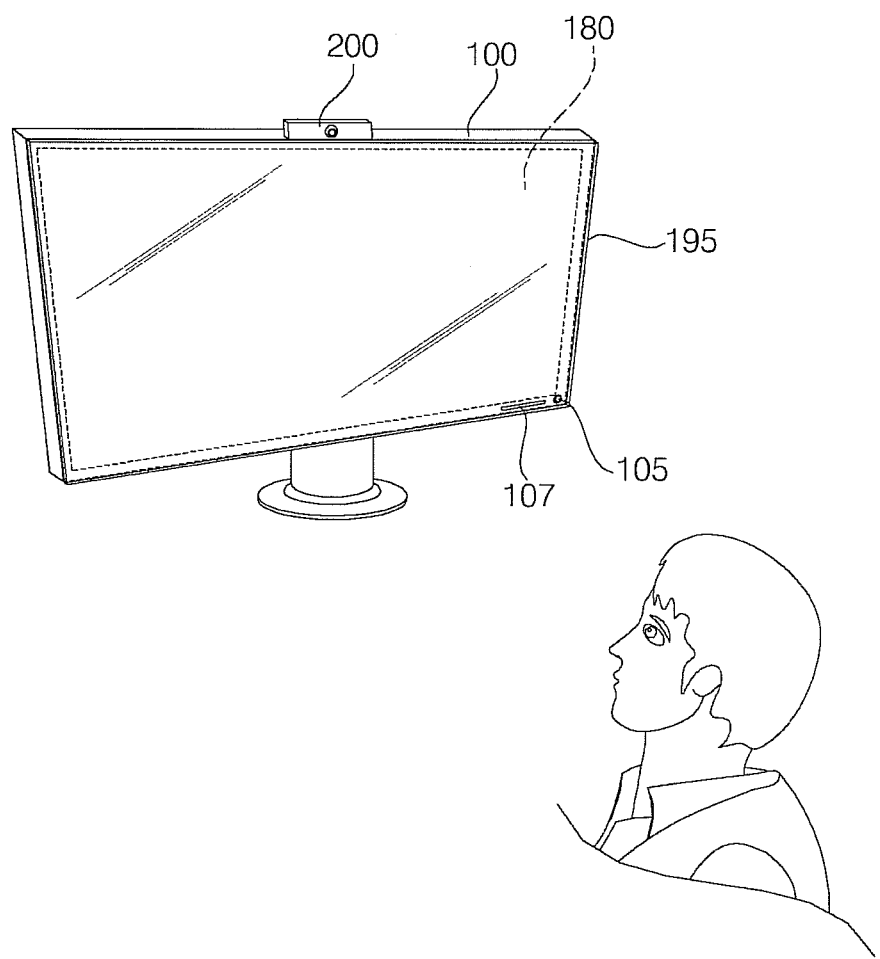
FIG. 1 illustrates an external appearance of an image display apparatus according to an embodiment of the present invention.
Figure 2:
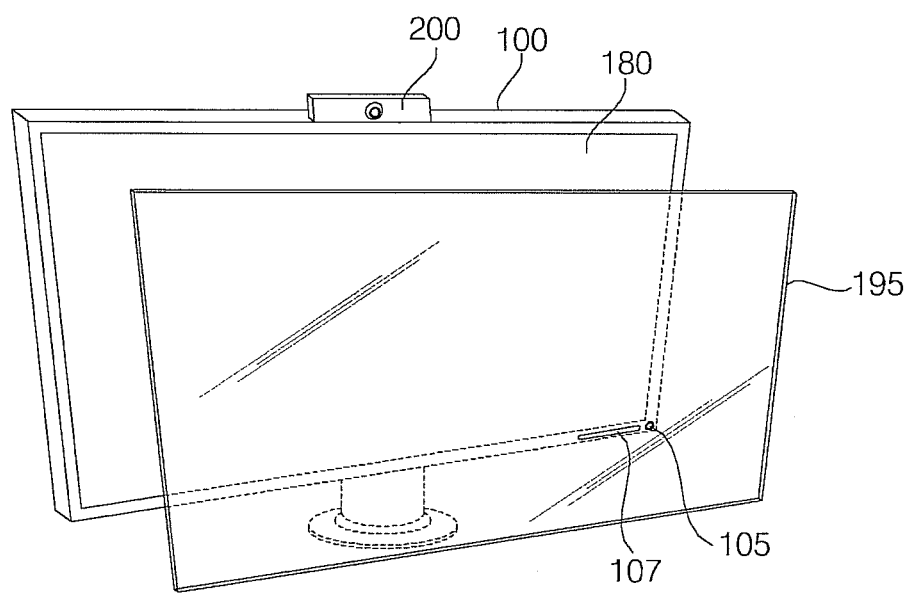
FIG. 2 illustrates a filter unit and a display of the image display apparatus of FIG. 1.

FIG. 1 illustrates an external appearance of an image display apparatus according to an embodiment of the present invention and FIG. 2 illustrates a filter unit and a display of the image display apparatus of FIG. 1.

The image display apparatus according to the embodiment of the present invention shown in FIGS. 1 and 2 is a device which can display a stereoscopic image, i.e., a 3D image. Specifically, the image display apparatus according to the embodiment of the present invention can display a 3D image in an autostereoscopic (glasses-free) manner.

To accomplish this, the image display apparatus 100 may include a display 180, a filter unit 195, a power key 105, and a local key such as a control key 107.

The display 180 may display an input image. Specifically, the display 180 may display a 3D image according to the embodiment of the present invention. The display 180 may also display a 2D image.

The filter unit 195 may be arranged at the user side of the display 180 at a predetermined distance from the display 180. FIG. 2 shows the display 180 and the filter unit 195 as being separated from each other.

The filter unit 195 changes light propagation direction according to a voltage input to the filter unit 195.

For example, in the case of a 2D mode, a first voltage (or first power) may be applied to the filter unit 195 to allow light to be emitted from the filter unit 195 in the same direction as light of a 2D image displayed on the display 180. As a result, the 2D image displayed on the display 180 is viewed as the same 2D image by the user.

In another example, in the case of a 3D mode, a second voltage (or second power) may be applied to the filter unit 195 to allow light of a 3D image displayed on the display 180 to be scattered. Such scattered light generates 3D effects. This allows the user to perceive the displayed 3D image as a stereoscopic image without wearing special glasses. As a result, it is possible to achieve autostereoscopic 3D display.

The display 180 may repeatedly display multi-view images (left-eye and right-eye images) to display 3D images in an autostereoscopic manner.

The filter unit 195 may employ a lenticular scheme that uses a lenticular lens, a parallax scheme that uses a slit array, and a scheme that uses a microlens array.

An image capture unit 200 may be attached to or arranged on an upper portion of the display 180. The image capture unit 200 may be used to capture an image of the user, specifically, an image of the face of the user and the captured image may be delivered to a controller 170 through an external device interface unit 130 or the like shown in FIG. 3.

Although the image capture unit 200 may be implemented using one camera, the image capture unit 200 is not necessarily implemented using one camera and may be implemented using a plurality of cameras.

Although the image capture unit 200 and the image display apparatus 100 are illustrated as individual units in FIG. 1, the image capture unit 200 may be embedded in the image display apparatus 100. That is, the image capture unit 200 may be provided inside the image display apparatus 100.

Figure 3:
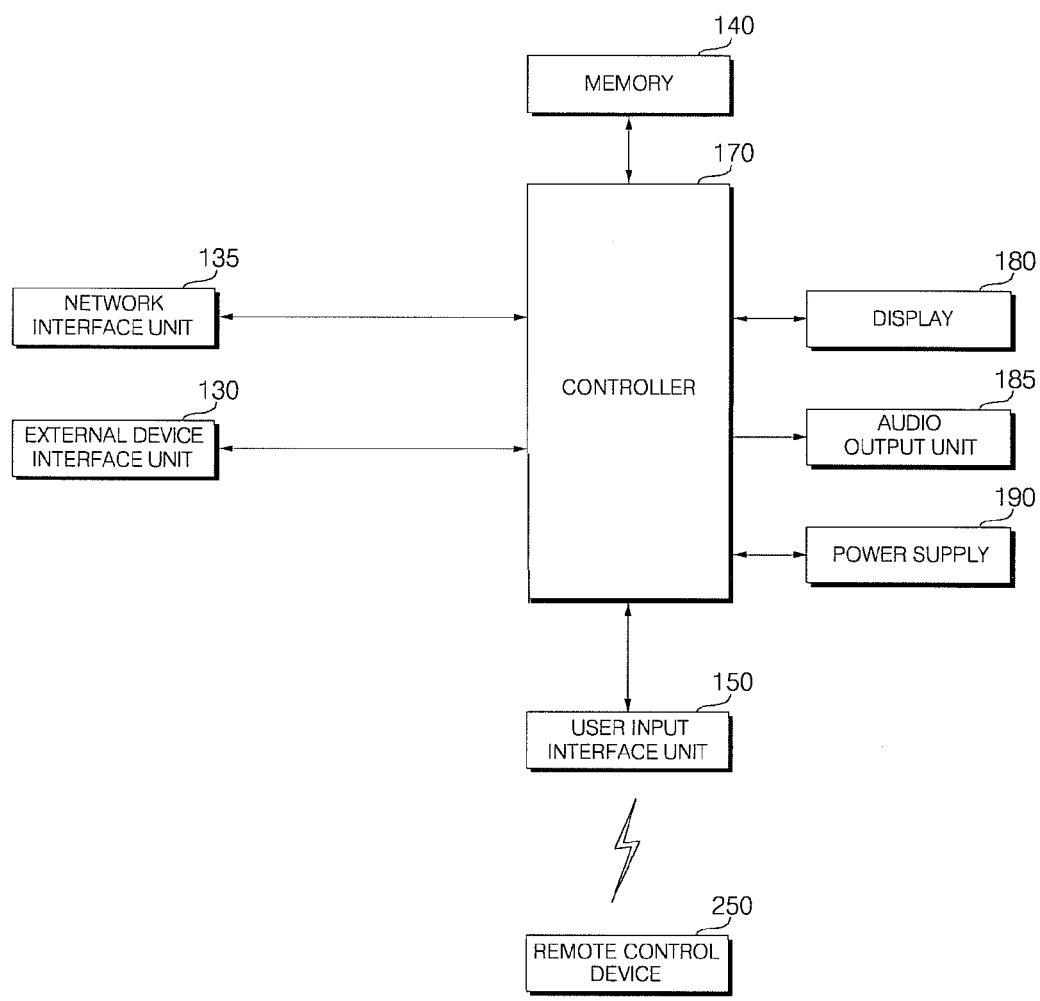
FIG. 3 is an internal block diagram of an image display apparatus according to an embodiment of the present invention.

FIG. 3 is an internal block diagram of an image display apparatus according to an embodiment of the present invention.

As shown in FIG. 3, the image display apparatus 100 according to the embodiment of the present invention may include the external device interface unit 130, a memory 140, a user input interface unit 150, a sensor unit (not shown), the controller 170, the display 180, an audio output unit 185, a power supply 190, and the filter unit 195.

The external device interface unit 130 may transmit or receive data to or from an external device 190 connected to the external device interface unit 130. To accomplish this, the external device interface unit 130 may include an A/V input/output unit (not shown) or a wireless communication unit (not shown).

The external device interface unit 130 may be connected wirelessly or by wire to an external device such as a Digital Versatile Disc (DVD) player, a Blu-ray player, a game console, a camera, camcorder, a computer (laptop), or a set-top box and may perform an input/output operation with the external device.

According to an embodiment of the present invention, the external device interface unit 130 may receive an image captured by the image capture unit 200.

When the image capture unit 200 is provided in the image display apparatus 100, an image captured by the image capture unit 200 may be transmitted to the controller 170 without passing through the external device interface unit 130.

The A/V input/output unit may receive video and audio signals of the external device. The wireless communication unit may perform local wireless communication with another electronic device.

The network interface unit 135 provides an interface for connecting the image display apparatus 100 to a wired/wireless network including the Internet. For example, the network interface unit 135 may receive content or data provided by an Internet service or content provider or a network manager over a network.

The memory 140 may store a program for performing signal processing and control in the controller 170 and store a processed image, audio or data signal.

In addition, the memory 140 may perform a function to temporarily store an image, audio or data signal input through the external device interface unit 130.

Although FIG. 3 shows an example in which the memory 140 is provided separately from the controller 170, the present invention is not limited to this example. The memory 140 may also be included in the controller 170.

The user input interface unit 150 sends a signal input by the user to the controller 170 or sends a signal from the controller 170 to the user.

For example, the user input interface unit 150 may receive a signal from a local key, for example, may receive a power on/off signal from the power key 105 or may receive an operation signal from the control key 107 and deliver the received signal to the controller 170. The user input interface unit 150 may also receive a user input signal from a remote control device 250 and deliver the same to the controller 170.

The user input interface unit 150 may deliver a user input signal received from a sensor unit (not shown), which senses user gestures, to the controller 170 and may transmit a signal received from the controller 170 to the sensor unit (not shown).

The controller 170 may demultiplex the TS signal input through the external device interface unit 130 or the network interface unit 135 or may process demultiplexed signals to generate and output image or audio signals.

The image signal processed by the controller 170 may be input to the display 180 such that an image corresponding to the image signal is displayed on the display 180. The image signal processed by the controller 170 may also be input to an external output device through the external device interface unit 130.

The audio signal processed by the controller 170 may be audibly output through the audio output unit 185. In addition, the audio signal processed by the controller 170 may be input to an external output device through the external device interface unit 130.

Although not shown in FIG. 3, the controller 170 may include a demultiplexer, an image processing unit, and the like as described later in detail with reference to FIG. 4.

The controller 170 may control the overall operation of the image display device 100.

In addition, the controller 170 may control the image display device 100 according to a user command input through the user input interface unit 150 or an internal program.

The controller 170 may control the display 180 to display an image. The image displayed on the display 180 may be a still image, a moving image, a 2D image or a 3D image.

The controller 170 may generate and display a predetermined object in the image displayed on the display 180 as a 3D object. For example, the object may be at least one of a webpage (newspaper, magazine, or the like), various menus, a widget, an icon, a still image, a moving image, or text.

Such a 3D object may provide a sense of depth different from that of the image displayed on the display 180. Preferably, the 3D object may be processed such that the 3D object appears to be located in front of the image displayed on the display 180.

The controller 170 may calculate the distance between the user and the image display apparatus 100 based on an image captured by the image capture unit 200.

For example, the controller 170 may calculate the distance between the user and the image display apparatus 100 using the distance between left and right eyes of the user in the captured image, specifically, using the number of pixels between the left and right eyes in the captured image. The controller 170 may calculate the distance between the user and the image display apparatus 100 such that the distance between the user and the image display apparatus 100 decreases as the number of pixels between the left and right eyes increases.

The controller 170 may determine whether or not the distance between the user and the image display apparatus 100 is within a range of distances optimal for viewing 3D images.

For example, when the distance between the user and the image display apparatus 100 is not within the optimal viewing distance range, the controller 170 may perform a control operation for displaying an object indicating that the user needs to be located within the optimal viewing distance range.

In another example, when the distance between the user and the image display apparatus 100 is not within the optimal viewing distance range, the controller 170 may perform a control operation for displaying a movement amount object, which is displayed in a 3D calibration mode, in an inactive state.

When the controller 170 has entered the 3D calibration mode, the controller 170 may perform a control operation for displaying an image capture region and displaying at least one of a left-eye object or a right-eye object based on the captured image. Here, the left-eye object and the right-eye object may be a left-eye test object and a right-eye test object. These left-eye and right-eye objects may also be referred to as objects for display correction or display correction objects.

In the 3D calibration mode, the controller 170 may receive a movement input for moving the image display reference coordinates of the display correction objects displayed on the screen and may then perform a control operation for rearranging and displaying the images (left-eye and right-eye images) after moving the image display reference coordinates according to a movement amount of the movement input.

Specifically, the controller 170 may perform a control operation for displaying display correction objects displayed on the screen after changing the pixel arrangement of the display correction objects according to the movement input for moving the image display reference coordinates.

As a result, the movement input for moving the image display reference coordinates may serve as an input for changing at least one of the pixels of the left-eye object to a pixel of the right-eye object or changing at least one of the pixels of the right-eye object to a pixel of the left-eye object.

Accordingly, the controller 170 may receive a pixel arrangement movement input for at least one of the left-eye object or the right-eye object and perform a control operation for changing at least one of the pixels of the displayed left-eye object to a pixel of the right-eye object or changing at least one of the pixels of the displayed right-eye object to a pixel of the left-eye object according to the pixel arrangement movement input and displaying the changed pixel.

The controller 170 may perform a control operation for displaying an object indicating that the user has to perform the pixel arrangement movement input operation until one of the left-eye object or the right-eye object is viewed through a corresponding one of the left eye or the right eye of the user.

For example, the controller 170 may perform a control operation for displaying an object instructing the user to close the right eye and displaying an object instructing the user to perform the movement input operation until the left-eye object is viewed by the left eye of the user, specifically, until the left-eye object is clearly viewed by the left eye of the user.

The display 180 converts an image signal, a data signal, an OSD signal or a control signal processed by the controller 170 or an image signal, data signal or a control signal received through the external device interface unit 130 and generates a drive signal. And the display 180 displays an image based on the generated drive signal.

The display 180 may include a Plasma Display Panel (PDP), a Liquid Crystal Display (LCD), an Organic Light Emitting Diode (OLED) display, and a flexible display. The display 180 may also be a 3D display.

As described above, the display 180 according to an embodiment of the present invention may be an autostereoscopic 3D display that requires no glasses. To accomplish this, the display 180 may include a lenticular-type filter unit 195.

The power supply 190 supplies overall power to the image display apparatus 100 to enable operation of each module or unit in the image display apparatus 100.

According to an embodiment of the present invention, the power supply 190 may supply first power or second power to the filter unit 195 under control of the controller 170.

The filter unit 195 may change light propagation direction according to a voltage or power applied to the filter unit 195.

In the 2D mode, the display 180 may display a 2D image and apply the first voltage to the filter unit 195 to allow light emitted from the 2D image displayed on the display 180 to be emitted in the same direction through the filter unit 195. This allows the user to perceive the displayed 2D image as the same 2D image.

In another example, the display 180 may display a 3D image and may apply the second voltage to the filter unit 195 to allow light emitted from a 3D image displayed on the display 180 to be scattered by the filter unit 195. Such scattered light generates 3D effects to allow the user to perceive the displayed 3D image as a 3D image without wearing special glasses.

The filter unit 195 may be arranged at the user side of the display 180 such that the filter unit 195 is spaced from the display 180. Specifically, the filter unit 195 may be arranged to be parallel to the display 180 or may be partially arranged obliquely or may be partially arranged convexly or concavely. The filter unit 195 may be arranged in the form of a sheet. Thus, the filter unit 195 according to the embodiment of the present invention may be referred to as a lens sheet.

The following is a brief description of the internal structure of the filter unit 195. The filter unit 195 may include first and second plates (not shown), which are arranged spaced from each other and to which voltage is applied, liquid crystal (not shown) arranged between the first and second plates, and first and second layers (not shown) which are arranged surrounding the liquid crystal between the first and second plates.

It is preferable that each of the first and second plates (not shown) be formed of a transparent material to allow light transmission and it is also preferable that each of the first and second plates be formed of a metal material to allow voltage application. For example, each of the first and second plates (not shown) may be formed of an ITO electrode.

The first and second layers (not shown) may surround the liquid crystal (not shown). To accomplish this, each of the first and second layers (not shown) may be formed of polyimide (PI).

Light passing through the liquid crystal (not shown) undergoes extraordinary or ordinary refraction according to a voltage applied to the first and second plates (not shown). That is, the liquid crystal exhibits anisotropic properties according to voltage applied across the liquid crystal.

When the first voltage V1 is applied between the first plate (not shown) and the second plate (not shown), the liquid crystal (not shown) is aligned in a direction parallel to an electric field generated through application of the first voltage V1 to allow the index of refraction of the PI layer (not shown) which is a polymer and the index of refraction of the liquid crystal (not shown) to match each other, thereby achieving a 2D effect.

On the other hand, when the second voltage V2 (for example, 0V) is applied between the first plate (not shown) and the second plate (not shown), the dispersed liquid crystal (not shown) exhibits a different index of refraction from the PI layer (not shown) since the alignment direction of the liquid crystal is not uniform. This causes scattering between the PI layer (not shown) and the liquid crystal (not shown), thereby achieving an autostereoscopic 3D effect.

The display 180 may include a touchscreen and thus may be used as an input device as well as an output device.

The audio output unit 185 receives an audio signal processed by the controller 170 and outputs corresponding audio.

The controller 170 may detect a gesture of the user based on an image captured by the image capture unit 200 or a signal detected by the sensor unit (not shown) or a combination of the image and the detected signal.

Although not illustrated, the image display apparatus 100 may further include a broadcast receiver (not shown). For example, the broadcast receiver may include a tuner unit (not shown) for receiving broadcast signals and a demodulator (not shown) for demodulating the received broadcast signals. The demodulated broadcast signals are input to the controller 170 and are then subjected to a procedure such as demultiplexing.

The image display device described in the present specification may be a monitor. The image display device may also be a TV receiver, a mobile phone, a smart phone, a notebook computer, a digital broadcast terminal, a Personal Digital Assistant (PDA), a Portable Multimedia Player (PMP), or the like.

FIG. 3 is a block diagram of the image display device 100 according to one embodiment of the present invention. Some of the components of the image display device 100 shown in the block diagram may be combined or omitted or other components may be added thereto according to the specifications of the image display device 100 that is actually implemented. That is, two or more components of the image display device 100 may be combined into one component or one component thereof may be divided into two or more components as necessary. The functions of the components described below are only examples to describe the embodiments of the present invention and specific operations and units thereof do not limit the scope of the present invention.

Figure 4:
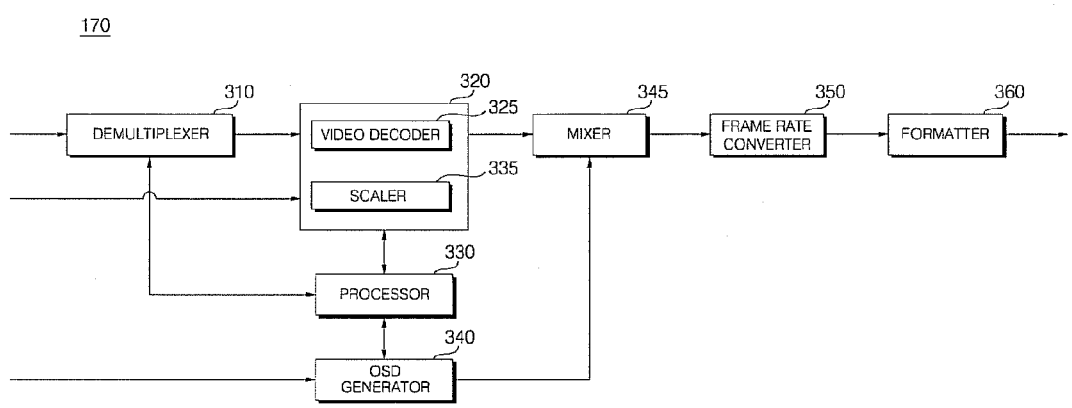
FIG. 4 is an internal block diagram of the controller of FIG. 3.

FIG. 4 is an internal block diagram of the controller of FIG. 3.

As shown in FIG. 4, the controller 170 according to one embodiment of the present invention may include a demultiplexer 310, an image processing unit 320, a processor 330, an OSD generator 340, a mixer 345, a Frame Rate Converter (FRC) 350, and a formatter 360. The controller 170 may further include an audio processing unit (not shown) and a data processing unit (not shown).

The demultiplexer 310 demultiplexes an input TS signal. For example, if an MPEG-2 TS signal is input, the demultiplexer may demultiplex the MPEG-2 TS signal into image, audio and data signals. The TS signal input to the demultiplexer 310 may be a TS signal output from the external device interface unit 130 or the network interface unit 135.

The image processing unit 320 may perform image processing upon the demultiplexed image signal. The image processing unit 320 may include an video decoder 325 and a scaler 335.

The video decoder 325 decodes the demultiplexed image signal and the scaler 335 adjusts the resolution of the decoded image signal such that the image signal can be output through the display 180.

The video decoder 325 may include various types of decoders.

The image signal decoded by the image processing unit 320 may include a 2D image signal alone, a mixture of a 2D image signal and a 3D image signal, or a 3D image signal alone.

For example, an external image signal received from the external device or the network may include a 2D image signal alone, a mixture of a 2D image signal and a 3D image signal, or a 3D image signal alone. Accordingly, thereafter, the controller 170 (specifically, the image processing unit 320 in the controller 170) may perform signal processing upon the external image signal or the broadcast image signal to output a 2D image signal alone, a mixture of a 2D image signal and a 3D image signal, or a 3D image signal alone.

The image signal decoded by the image processing unit 320 may include a 3D image signal in various formats. For example, the decoded image signal may be a 3D image signal including a color difference image and a depth image, or a 3D image signal including multi-view image signals. The multi-view image signals may include, for example, a left-eye image signal and a right-eye image signal.

Here, the format of the 3D image signal may include a side-by-side format in which the left-eye image L and the right-eye image R are arranged in a horizontal direction, a top/down format in which the left-eye image and the right-eye image are arranged in a vertical direction, a frame sequential format in which the left-eye image and the right-eye image are arranged in a time division manner, an interlaced format in which the left-eye image and the right-eye image are mixed in lines (i.e., interlaced), and a checker box format in which the left-eye image and the right-eye image are mixed in boxes (i.e., box-interlaced).

The processor 330 may control overall operation of the image display apparatus 100 or overall operation of the controller 170.

The processor 330 may also control the image display apparatus 100 according to a user command received through the user input interface unit 150 or according to an internal program.

The processor 330 may also control data transmission between the controller 170 and the network interface unit 135 or the external device interface unit 130.

In addition, the processor 330 may control operations of the demultiplexer 310, the image processing unit 320, the OSD generator 340, or the like in the controller 170.

The OSD generator 340 generates an OSD signal according to a user input signal or automatically. For example, the OSD generator 340 may generate a signal for displaying a variety of information as graphics or text on the screen of the display 180 based on a user input signal. The generated OSD signal may include a variety of data such as a user interface screen, various menu screens, a widget or an icon of the image display device 100. The generated OSD signal may include a 2D object or a 3D object.

The mixer 345 may mix the OSD signal generated by the OSD generator 340 with the image signal decoded by the image processing unit 320. Here, each of the OSD signal and the decoded image signal may include at least one of a 2D signal and a 3D signal. The mixed image signal is provided to the frame rate converter 350.

The frame rate converter 350 may convert the frame rate of the input image. The frame rate converter 350 may also directly output the input image signal without frame rate conversion.

The formatter 360 may arrange the 3D image having the converted frame rate.

The formatter 360 may receive the mixed signal (i.e., the mixture of the OSD signal and the decoded image signal) from the mixer 345 and separate the mixed signal into a 2D image signal and a 3D image signal.

In the present specification, the 3D image signal includes a 3D object. Examples of such an object may include a Picture In Picture (PIP) image (still image or moving image), various menus, a widget, an icon, text, or an object, a person or a background present in an image, a web page (newspaper, magazine, or the like), etc.

The formatter 360 may change the format of the 3D image signal. For example, when 3D images are input in any of the various formats described above, the formatter 360 may change the input 3D images into multi-view images. Specifically, the formatter 360 may change the input 3D images into repeating multi-view images. This allows the image display apparatus to display 3D images in an autostereoscopic manner.

The formatter 360 may switch a 2D image signal into a 3D image signal. For example, according to a 3D image generation algorithm, the formatter 360 may detect an edge or a selectable object from a 2D image signal and may then separate an object according to the detected edge or selectable object to generate a 3D image signal. Here, the generated 3D image signal may be a multi-view image signal as described above.

Although not illustrated, the controller 170 may further include a 3D processor (not shown) for 3-dimensional (3D) effects signal processing, downstream of the formatter 360. The 3D processor (not shown) may perform signal processing for brightness, tint, and color adjustment of an image signal in order to increase 3D effects.

The audio processing unit (not shown) in the controller 170 may perform audio processing upon the demultiplexed audio signal. To accomplish this, the audio processing unit (not shown) may include various decoders.

The audio processing unit (not shown) in the controller 170 may perform base and treble adjustment (equalization), volume adjustment, or the like.

The data processing unit (not shown) in the controller 170 may perform data processing upon the demultiplexed data signal. For example, if the demultiplexed data signal is a coded data signal, the data processing unit may decode the coded data signal.

Although, in the example of FIG. 4, the signals from the OSD generator 340 and the image processing unit 320 are mixed by the mixer 345 and are then subjected to 3D processing by the formatter 360, the present invention is not limited to the example of FIG. 4 and the mixer 345 may be located downstream of the formatter 360. That is, the formatter 360 may perform 3D processing upon the output of the image processing unit 320 to generate a 3D signal and the OSD generator 340 may generate an OSD signal and perform 3D processing upon the OSD signal to generate a 3D signal, and the mixer 345 may then mix the 3D signals.

The controller 170 shown in the block diagram of FIG. 4 is an embodiment of the present invention. Some of the components of the controller 170 may be combined or omitted or other components may be added thereto according to the type of the controller 170 that is actually implemented.

In particular, the frame rate converter 350 and the formatter 360 may be individually provided outside the controller 170.

Figure 5:
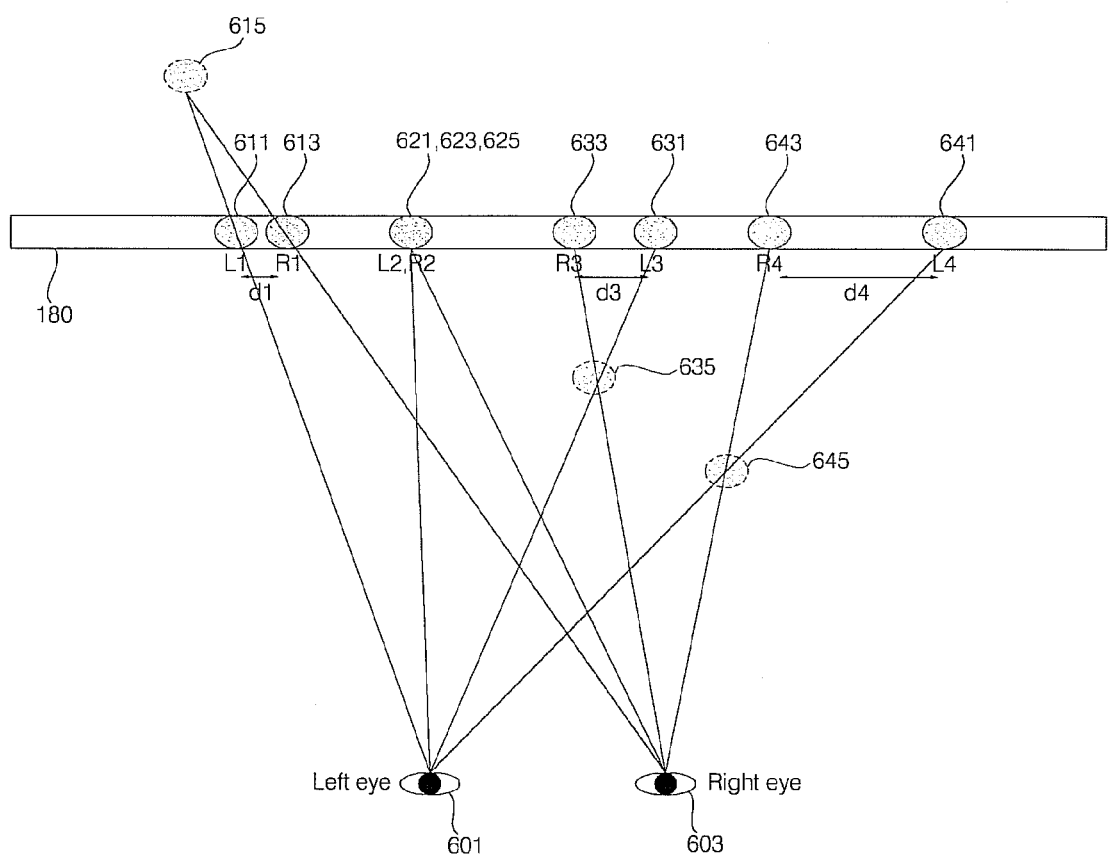
FIG. 5 illustrates image formation by a left-eye image and a right-eye image.
Figure 6:
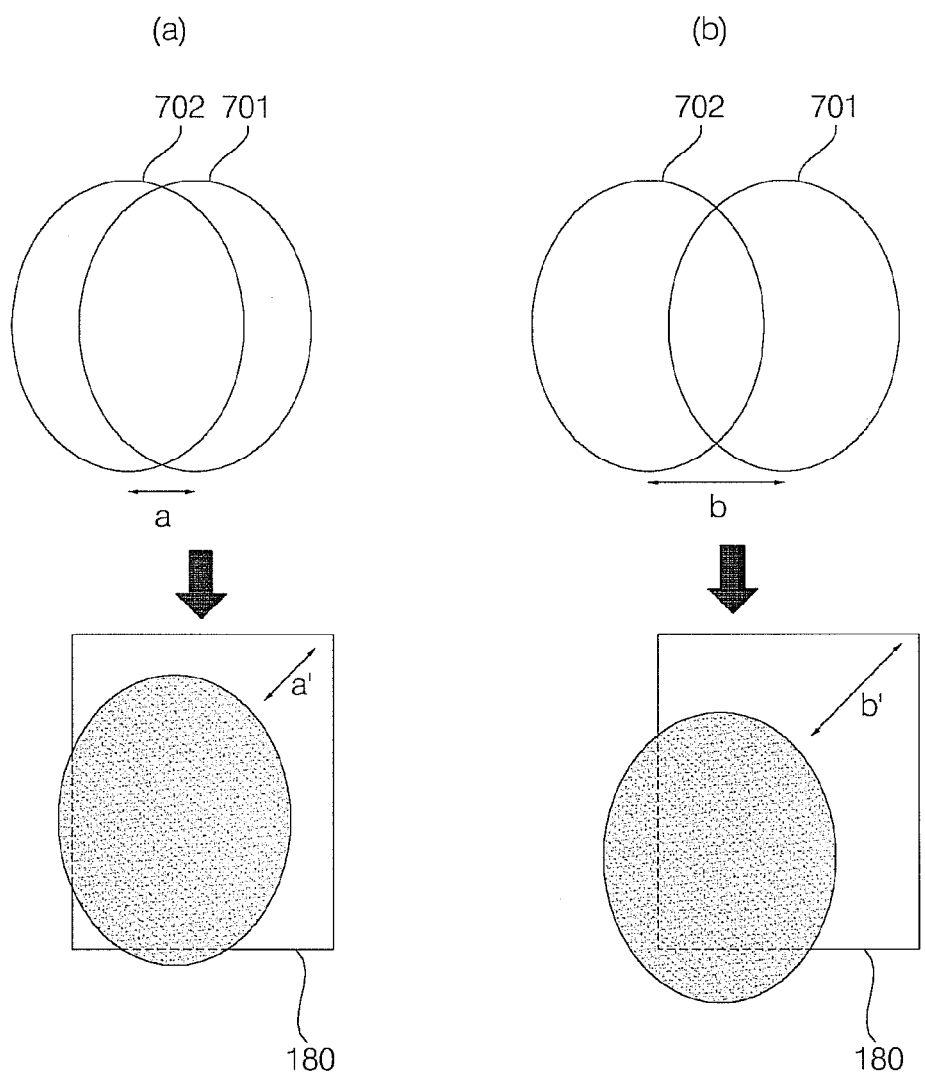
FIG. 6 illustrates the depth of a 3D image according to the distance between a left-eye image and a right-eye image.

FIG. 5 illustrates image formation by a left-eye image and a right-eye image, and FIG. 6 illustrates the depth of a 3D image according to the distance between a left-eye image and a right-eye image.

A plurality of images or a plurality of objects 615, 625, 635 and 645 is illustrated in FIG. 5.

First, the first object 615 includes a first left-eye image 611 (L) based on a first left-eye image signal and a first right-eye image 613 (R) based on a first right-eye image signal. A distance between the first right-eye image 613 and the first left-eye image 611 on the display 180 is d1, as illustrated. Here, the user perceives that an image is formed at an intersection between a line connecting the left eye 601 and the first left-eye image 611 and a line connecting the right eye 603 and the first right-eye image 613. Accordingly, the user perceives that the first object 615 is located behind the display unit 180.

Next, the second object 625 includes a second left-eye image 621 (L) and a second right-eye image 623 (R). Since the second left-eye image 621 and the second right-eye image 623 are displayed so as to overlap each other on the display unit 180, a distance between the second left-eye image 621 and the second right-eye image 623 is 0 as illustrated. Accordingly, the user perceives that the second object 625 is located on the display 180.

Next, the third object 635 includes a third left-eye image 631 (L) and a third right-eye image 633 (R), and the fourth object 645 includes a fourth left-eye image 641 (L) and a fourth right-eye image 643 (R). The distance between the third left-eye image 631 and the third right-eye image 633 is d3 and the distance between the fourth left-eye image 641 and the fourth right-eye image 643 is d4 as illustrated.

According to the above-described method, the user perceives that the third objects 635 and the fourth object 645 are located at image formation locations and thus are located in front of the display 180 as shown in FIG. 5.

Here, the user perceives that the fourth object 645 is located in front of the third object 635, i.e., protrudes from the third object 635, since the distance d4 between the fourth left-eye image 641 (L) and the fourth right-eye image 643 (R) is greater than the distance d3 between the third left-eye image 631 (L) and the third right-eye image 633 (R).

In the embodiment of the present invention, the apparent distance between the display 180 and each of the objects 615, 625, 635 and 645, which is perceived by the user, is referred to as "depth". The depth of the object that appears to the user to be located behind the display 180 has a negative value (−) and the depth of the object that appears to the user to be located in front of the display 180 has a positive value (+). That is, depth increases as the degree of protrusion of the object from the display toward the user increases.

From FIG. 6, it can be seen that, when the distance a between a left-eye image 701 and a right-eye image 702 shown in FIG. 6(*a*) is less than the distance b between a left-eye image 701 and a right-eye image 702 shown in FIG. 6(*b*), the depth a' of the 3D object of FIG. 6(*a*) is less than the depth b' of the 3D object of FIG. 6(*b*).

When the 3D image includes a left-eye image and a right-eye image, a position at which the image is formed as perceived by the user changes according to the distance between the left-eye image and the right-eye image. Accordingly, by adjusting the displayed distance between the left-eye image and the right-eye image, it is possible to adjust the depth of the 3D image or the 3D object including the left-eye image and the right-eye image.

Figure 7:
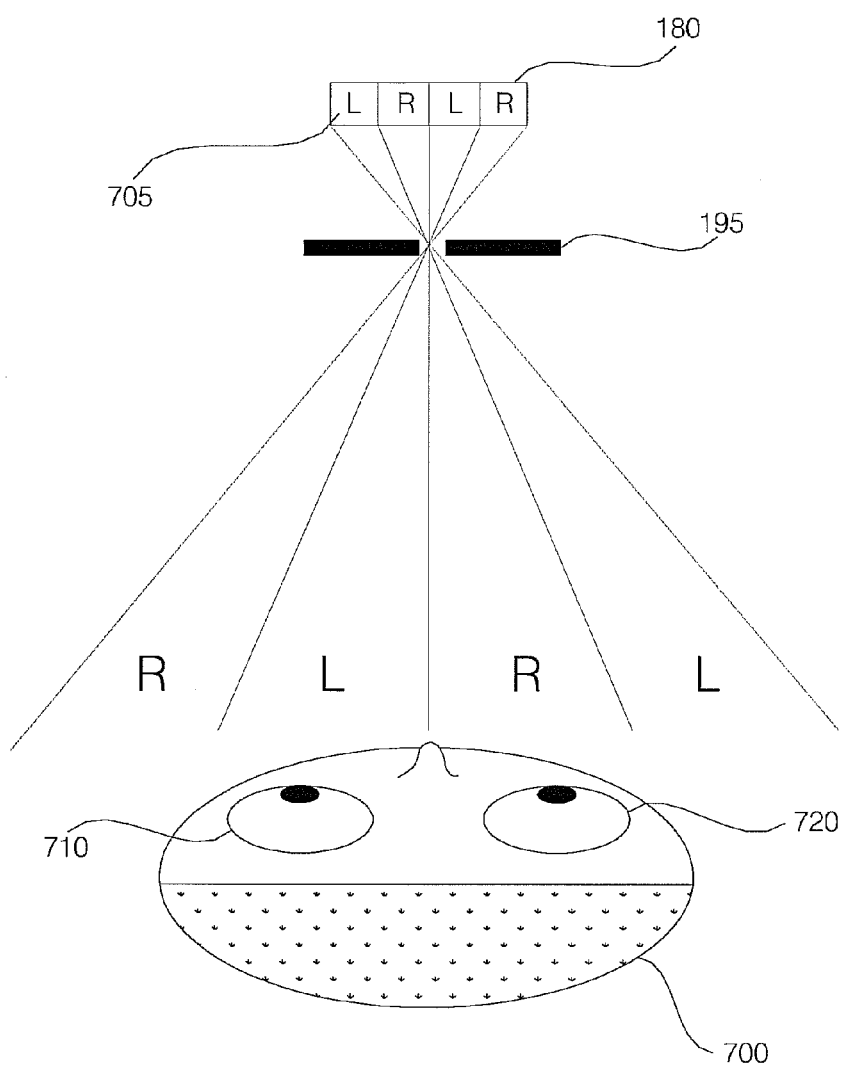
FIG. 7 is a drawing used to explain an autostereoscopic 3D scheme applied to the image display apparatus according to an embodiment of the present invention.

FIG. 7 is a drawing used to explain an autostereoscopic 3D scheme applied to the image display apparatus according to an embodiment of the present invention.

As shown in FIG. 7, the image display apparatus 100 includes a display 180 and a filter unit 195 that is spaced from the display 180 by a predetermined distance in order to implement autostereoscopic 3D display.

When the first voltage is applied to the filter unit 195, the filter unit 195 directly passes an image displayed on the display 180 as described above. This enables 2D image display.

On the other hand, when the second voltage, for example, 0V, is applied to the filter unit 195, the filter unit 195 scatters light emitted from the image displayed on the display 180 to provide scattered images to the user. This generates a 3D effect allowing the user to perceive a stereoscopic image without wearing special glasses.

In the 3D mode, multi-view images displayed on the display 180 may be repeatedly arranged so as to allow the user to view stereoscopic images regardless of the position of the user.

FIG. 7 illustrates an example in which multi-view images 705 are displayed on the display 180 such that a left-eye image L, a right-eye image R, a left-eye image L, and a right-eye image R are repeatedly arranged on the display 180. These images L, R, L, and R are scattered by the filter unit 195 to allow the left-eye image L to be viewed by the left eye 710 of a user 700 and the left-eye image R to be viewed by the right eye 720 of the user 700.

Figure 16:
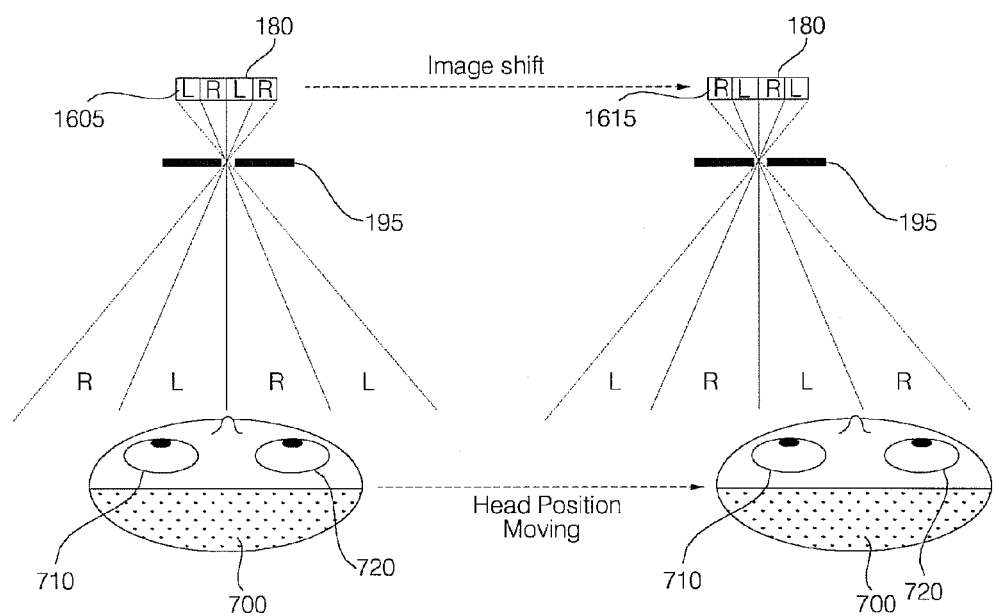

In the case in which the user is in motion, a head tracking technique may be used to determine the correct position of the user as shown in FIG. 16. For example, the center of the left and right eyes 710 and 720 of the user 700 may be calculated based on an image captured by the image capture unit 200 and the position of the user may then be determined using the calculated center. This method will be described later with reference to FIG. 16.

The following is a description of an autostereoscopic 3D scheme which allows the user to view an optimal 3D image according to the position of the user.

Figure 8:
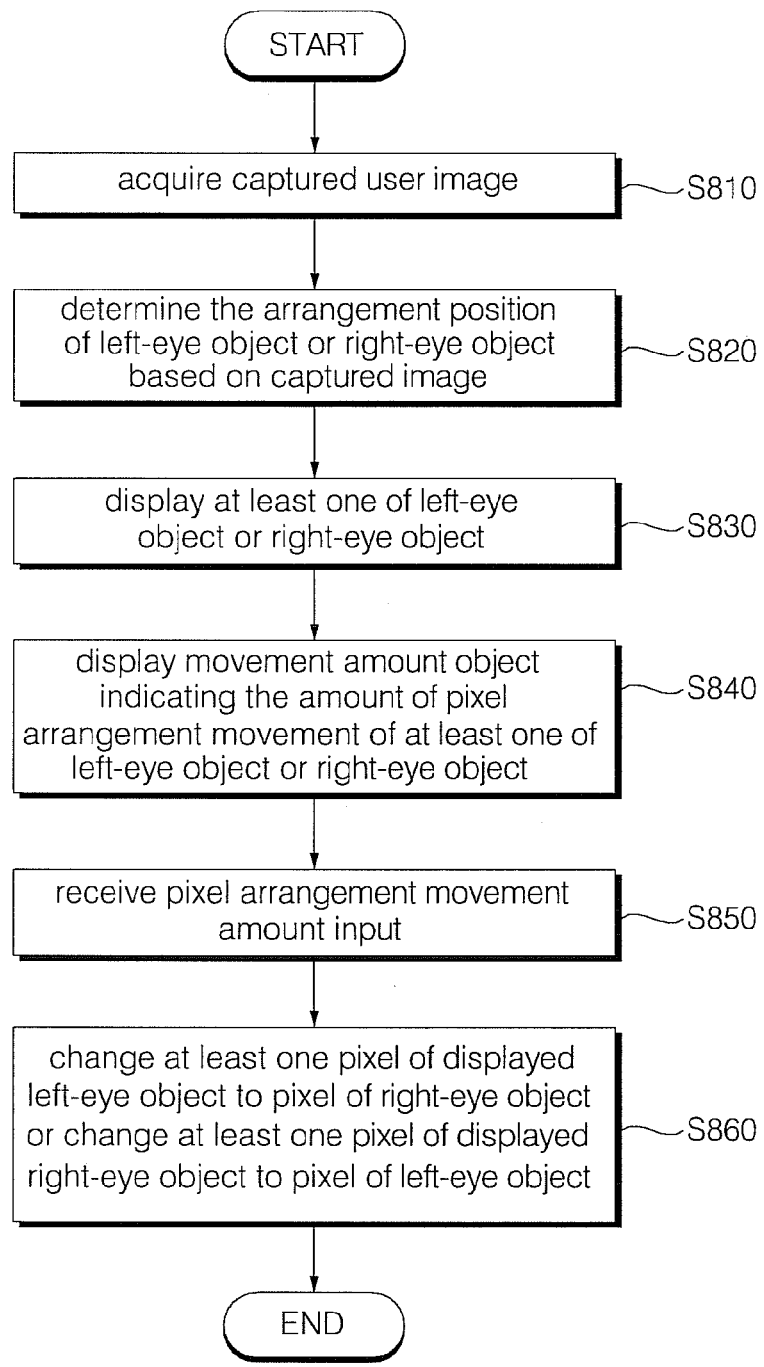
FIG. 8 is a flowchart showing a method for operating an image display apparatus according to an embodiment of the present invention.

FIG. 8 is a flowchart showing a method for operating an image display apparatus according to an embodiment of the present invention and FIGS. 9 to 17 are drawings used to explain a variety of examples of the method of FIG. 8.

As shown in FIG. 8, the controller 170 acquires a captured image of the user (S810).

Specifically, the image capture unit 200 captures an image of the user. The captured image may be input to the controller 170 through the external device interface unit 130. When the image capture unit 200 is provided in the image display apparatus 100, the controller 170 may acquire the captured image directly from the image capture unit 200.

For example, when the 3D calibration mode is selected, an image capture region 920 may be displayed. The image capture region 920 is an area in which the captured image can be displayed. The image capture region 920 allows the user to determine whether or not the captured image is appropriate by viewing the image displayed inside the image capture region 920.

Figure 9:
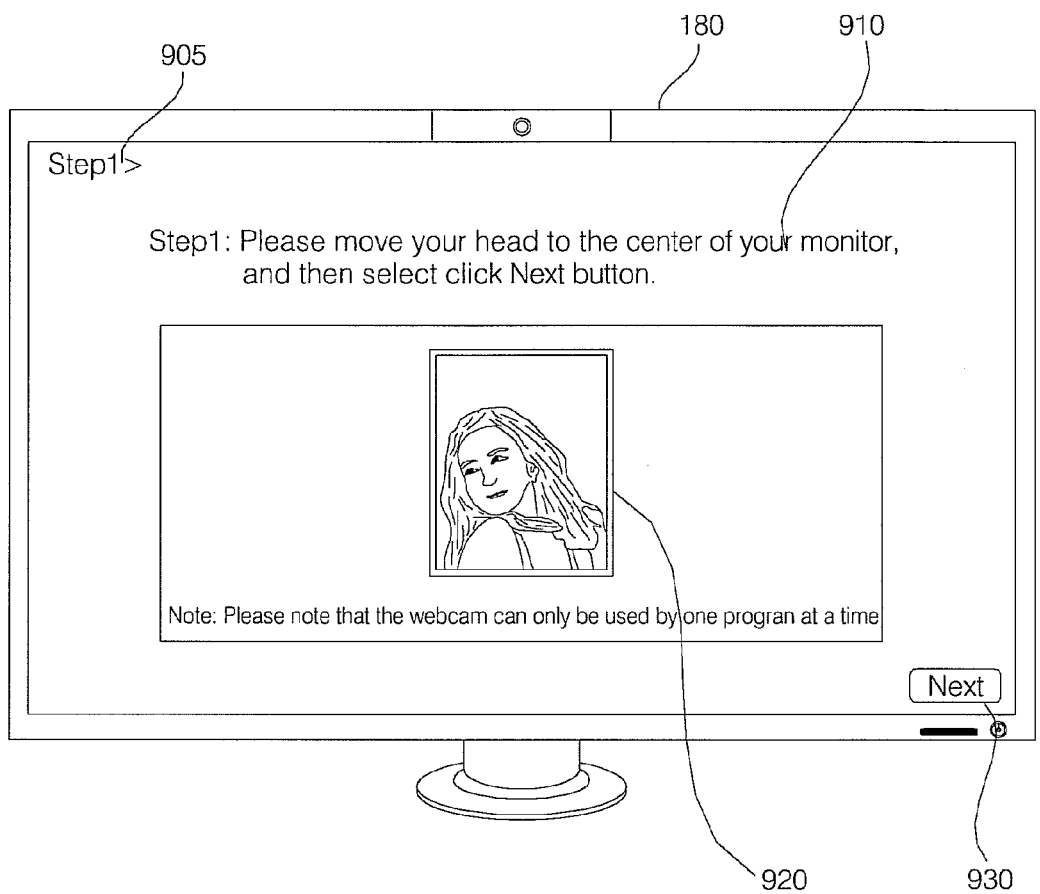
FIGS. 9 to 17 are drawings used to explain a variety of examples of the method of FIG. 8.

FIG. 9 illustrates a first step of the 3D calibration mode in which an object 910 instructing the user to be located at the center portion of the image display apparatus 100 and an object 930 indicating movement to a next step are displayed in addition to the image capture region 920.

The object 910 may induce the user to be located at the center portion of the image display apparatus 100.

Although a message asking the user to be located at the center portion of the image display apparatus 100 is delivered to the user through the object 910 in the example of FIG. 9, the message may also be audibly delivered to the user. That is, an audio message asking the user to be located at the center portion of the image display apparatus 100 may also be output through the audio output unit 185. Instead of each object described below, such an audio message may be output through the audio output unit 185.

The 3D calibration mode may be selected using a menu that is displayed by operating the control key 107. The 3D calibration mode may also be selected by operating a hot key.

The arrangement position of a left-eye object or a right-eye image object is determined based on the captured image (S820).

Specifically, the controller 170 determines the arrangement position of a left-eye object or a right-eye image object based on a received captured image.

The controller 170 may determine the arrangement position of the left-eye object or the right-eye object such that multi-view images are repeatedly arranged as shown in FIG. 7.

The left-eye object or the right-eye object is an object that is adjusted to be clearly viewed by the left eye or the right eye of the user in the 3D calibration mode. That is, the left-eye object or the right-eye object may be a left-eye test object or a right-eye test object.

At least one of the left-eye object or the right-eye object is displayed (S830). Then, a movement amount object indicating the amount of pixel arrangement movement of at least one of the left-eye object or the right-eye object is displayed (S840). Then, a pixel arrangement movement amount input is received (S850). Then, at least one of the pixels of the displayed left-eye object is changed to a pixel of the right-eye object and the changed pixel is displayed or at least one of the pixels of the displayed right-eye object is changed to a pixel of the left-eye object and the changed pixel is displayed (S860).

The controller 170 may perform a control operation for displaying at least one of the left-eye object or the right-eye object on the display 180 according to the determined arrangement position.

Since the image display apparatus 100 is in the 3D mode, the controller 170 may perform a control operation for applying the second voltage to the filter unit 195 to allow light to be scattered by the filter unit 195.

Figure 10:
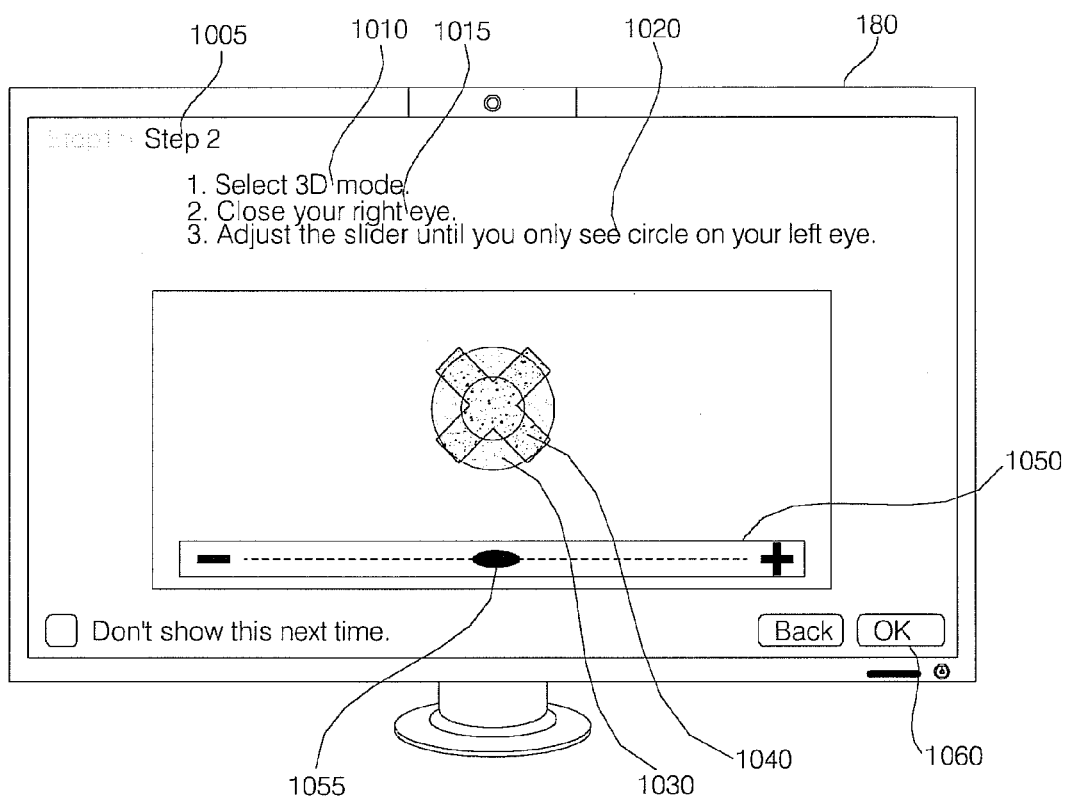

FIG. 10 illustrates an example in which a left-eye object 1030 and a right-eye object 1040 are simultaneously displayed. It is preferable that, when the left-eye object 1030 and the right-eye object 1040 are simultaneously displayed, at least one of the color or shape of the left-eye object 1030 be different from a corresponding one of the right-eye object 1040.

In the example of FIG. 10, the left-eye object 1030 has a circular shape and is green in color and the left-eye object 1040 has an X shape and is red in color. This allows the user to discriminate between the left-eye object 1030 and the right-eye object 1040.

Figure 12:
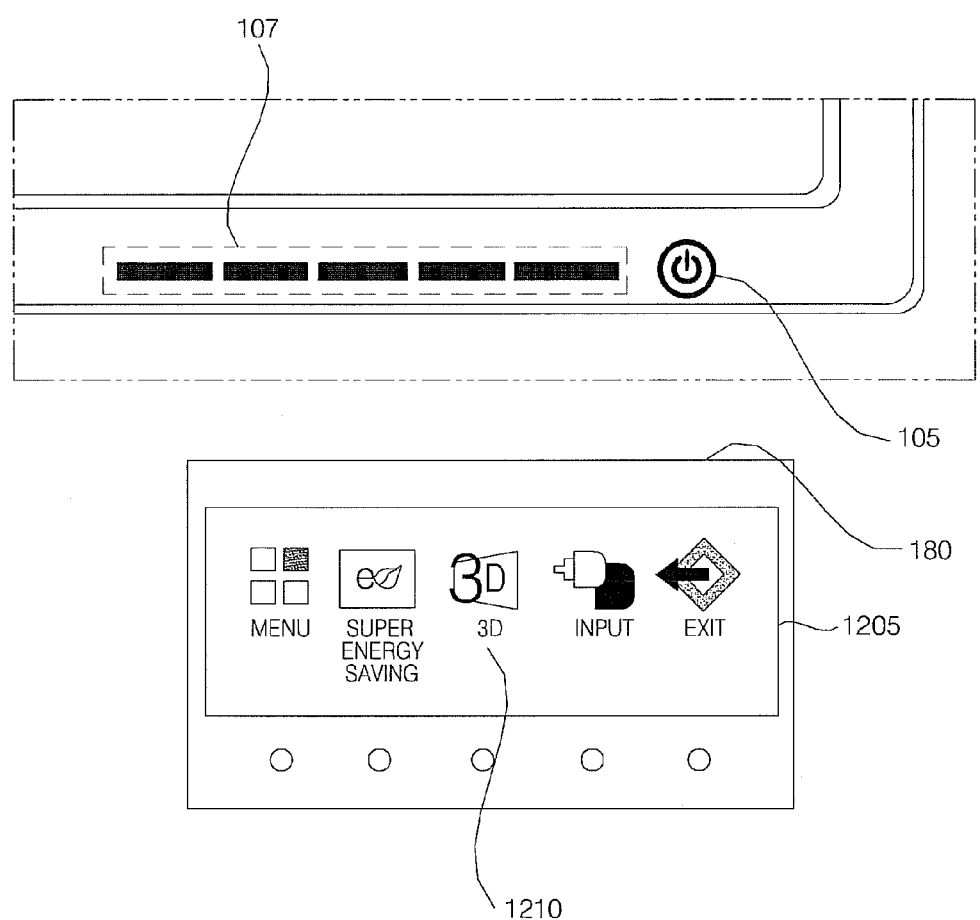

On the other hand, when the image display apparatus has not entered the 3D mode, an object 1010 instructing the user to enter the 3D mode may be displayed. FIG. 12 illustrates an exemplary method for entering the 3D mode.

When the user depresses the control key 107 which may be located at a lower portion of the display 180, a menu screen 1205 may be displayed on the display 180 as shown in FIG. 12. The menu screen 1205 is an OSD menu screen which may include menu items, a super energy saving item, a 3D item 1210, an input item, an exit item, and the like.

When the 3D item 1210 is selected by operating the control key 107, the image display apparatus 100 may directly enter the 3D mode. Alternatively, when the 3D item 1210 is selected, a head tracking item and a 3D calibration item may be displayed as sub-menu items of the 3D item 1210. When the 3D calibration item is selected from among these sub-menu items, the image display apparatus may display a screen as shown in FIG. 9 while automatically entering the 3D mode.

FIG. 10 also illustrates a second step of the 3D calibration mode in which an object 1010 instructing the user to enter the 3D mode, an object 1015 instructing the user to close the right eye, and object 1025 instructing the user to perform a movement input operation until a left-eye object 1030 is viewed.

Although the objects 1010, 1015, and 1020 are simultaneously displayed in the example of FIG. 10, the objects 1010, 1015, and 1020 may also be sequentially displayed. That is, the object 1015 and the object 1020 may be sequentially displayed after the object 1010 is displayed.

FIG. 10 also illustrates, as an example, a movement amount object 1050 indicating the amount of movement of a movement input for moving the reference coordinates of image arrangement of the display correction objects 1030 and 1040 displayed on the screen.

The movement amount object 1050 may be a movement object indicating the amount of pixel arrangement movement since the movement amount object 1050 can determine the pixel arrangement movement of the display correction objects 1030 and 1040 displayed on the screen.

For example, when a rightward movement input is input using the control key 107, a control bar 1055 of the movement amount object 1050 may be moved to the right.

In the case in which the display 180 is of a touch type, the control bar 1055 may be moved to the right when the control bar 1055 is dragged to the right after the control bar 1055 of the movement amount object 1050 is touched.

When such rightward movement input is performed, the controller 170 performs a control operation for moving the reference coordinates of the display correction objects displayed on the screen by the movement amount of the rightward movement input and then rearranging and displaying the images of the display correction objects.

Figure 11:
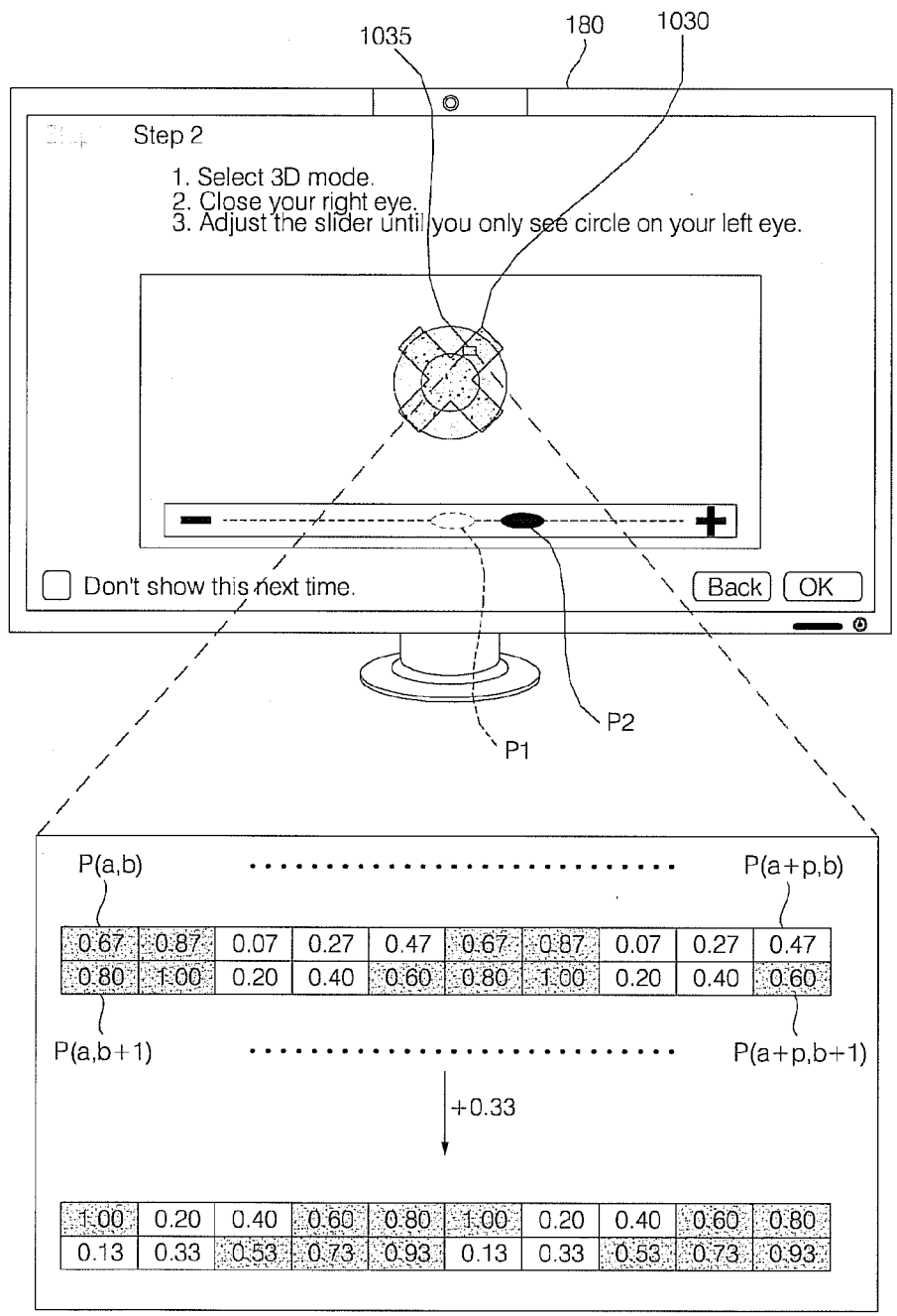

Specifically, as shown in FIG. 11, when rightward movement input is performed, the control bar 1055 moves from a first point P1 to a second point P2 to the right and the controller 170 moves the reference coordinates of the display correction objects 1030 and 1040 displayed on the screen by the movement amount of the rightward movement input and rearranges the images of the display correction objects 1030 and 1040. The controller 170 then performs a control operation for displaying the rearranged images on the display 180.

For example, an image arrangement index having a value between 0 and 1 may be assigned to each pixel and, when the image arrangement index of a pixel is equal to or less than 0.5, the pixel may be a left-eye pixel corresponding to a left-eye object such that the pixel displays the color of the left-eye object.

On the other hand, when the image arrangement index of a pixel is greater than 0.5, the pixel may be a right-eye pixel corresponding to a right-eye object such that the pixel displays the color of the right-eye object.

The movement amount of the movement input for moving the reference coordinates, i.e., the pixel arrangement movement amount, may have a value between 0 and 1.

Accordingly, when an movement input for moving the reference coordinates by a movement amount (i.e., by a pixel arrangement movement amount) has been performed, the controller 170 calculates a final image arrangement index value of each pixel of the display correction objects 1030 and 1040 by summing the image arrangement index of the pixel of the display correction objects 1030 and 1040 and the pixel arrangement movement amount.

The controller 170 then performs a control operation for rearranging the left-eye pixels and the right-eye pixels according to the final image arrangement index value of each pixel and then displaying a color assigned to each pixel.

Referring to FIG. 11, a region 1035 in which the left-eye object and the right-eye object overlap may include 2×10 pixels as shown in FIG. 11.

When the control bar 1055 moves to the second point P2, the pixel arrangement movement amount may correspond to a value of 0.33.

From FIG. 11, it can be seen that left-eye pixels and right-eye pixels among the pixels P(a, b), . . . P(a+9, b), P(a, b+1), . . . and P(a+9, b+1) before the control bar is moved are set differently from left-eye pixels and right-eye pixels among the pixels (a, b), . . . P(a+9, b), P(a, b+1), . . . and P(a+9, b+1) after the control bar is moved.

That is, FIG. 11 illustrates an example in which pixels P(a, b), P(a+1, b), P(a+5, b), P(a+6, b), P(a, b+1), P(a+1, b+1), P(a+4, b+1), P(a+5, b+1), P(a+6, b+1), and P(a+9, b+1) are set as right-eye pixels before the control bar is moved, whereas pixels P(a, b), P(a+3, b), P(a+4, b), P(a+5, b), P(a+8, b), P(a+9, b), P(a+2, b+1), P(a+3, b+1), P(a+4, b+1), P(a+7, b+1), P(a+8, b+1), and P(a+9, b+1) are set as right-eye pixels after the control bar is moved. Accordingly, the displayed color of each of the pixels is changed as the control bar is moved.

On the other hand, when such a movement input has been completed, the user may select an object (OK) 1060 indicating completion of setting. The 3D calibration mode is terminated upon selection of the object 1060.

When movement input is performed until the left-eye object 1030 is viewed with the left eye 710 of the user, such setting allows the user to clearly view the left-eye object 1030 with the left eye. Thus, it is possible to allow the user to view optimal 3D images, thereby increasing user convenience.

The 3D calibration mode may be performed to determine whether or not the left-eye object and the right-eye object are correctly viewed with the left eye and the right eye of the user when the left-eye object and the right-eye object are displayed according to the position of the user after the position of the user is determined through a captured image of the user in the case in which the position of the user varies. Through display of the objects 1010, 1015, 1020, 1030, 1040, and 1050 as shown in FIG. 10 and such movement amount adjustment, it is possible to allow the user to view optimal 3D images.

The objects 1010, 1015, 1020, 1030, 1040, and 1050 as shown in FIG. 10 may also be displayed before a 3D image is displayed in the case in which a 3D mode for displaying 3D images has been selected rather than in the case in which the 3D calibration mode is selected.

That is, the left-eye object 1030 and the right-eye object 1040 may be directly displayed without capturing an image of the user and also without determining the positions of the left-eye object 1030 and the right-eye object 1040 through the captured image of the user and then at least one of the pixels of the displayed left-eye object may be changed to a pixel of the right-eye object or at least one of the pixels of the displayed right-eye object may be changed to a pixel of the left-eye object and the changed pixel may then be displayed according to movement of the control bar 1055 in the movement amount object 1050. Especially, such setting allows the left-eye object 1030 to be clearly viewed by the left eye 710 of the user when movement input has been performed until the left-eye object 1030 is viewed by the left eye 710 of the user. Such setting also allows the right-eye object 1040 to be clearly viewed by the right eye 720 of the user. Accordingly, it is possible to allow the user to view optimal 3D images, thereby increasing user convenience.

On the other hand, the optimal viewing distance when a 3D image is displayed in an autostereoscopic manner may be within a predetermined range. For example, the optimal viewing distance may be within a range of distances of 50 to 80 cm from the image display apparatus 100.

As described above with reference to FIG. 9, the controller 170 may calculate the distance between the user and the image display apparatus 100 using the distance between the left and right eyes of the user in the image captured by the image capture unit 200, specifically, using the number of pixels between the left and right eyes in the captured image.

Figure 13:
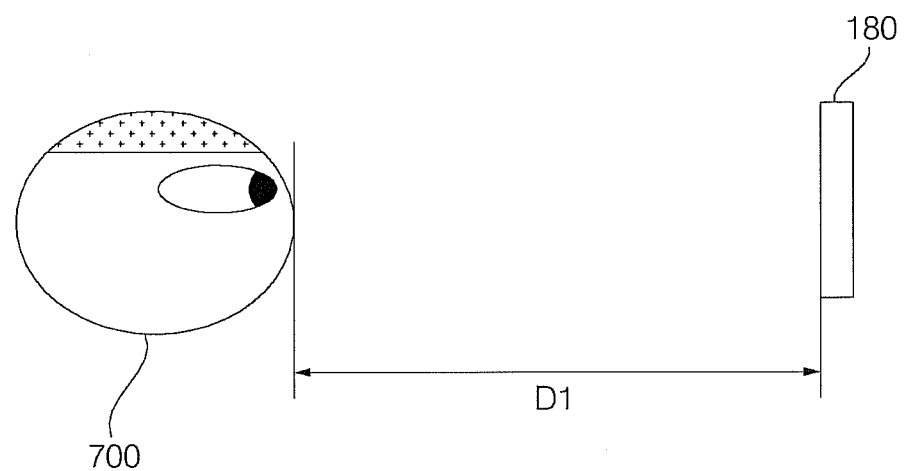

FIG. 13 illustrates an example in which the distance between the display 180 of the image display apparatus 100 and the user 700 is D1.

When the distance between the display 180 of the image display apparatus 100 and the user 700 is within the predetermined range, the objects 1010, 1015, 1020, 1030, 1040, and 1050 are normally displayed as shown in FIG. 10.

Figure 14:
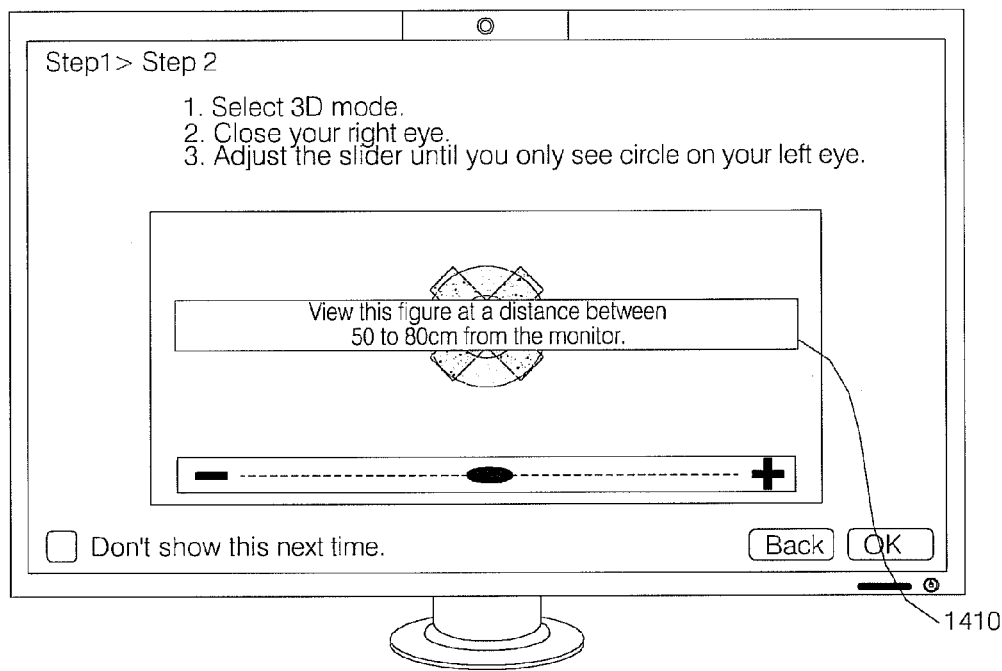
Figure 15:
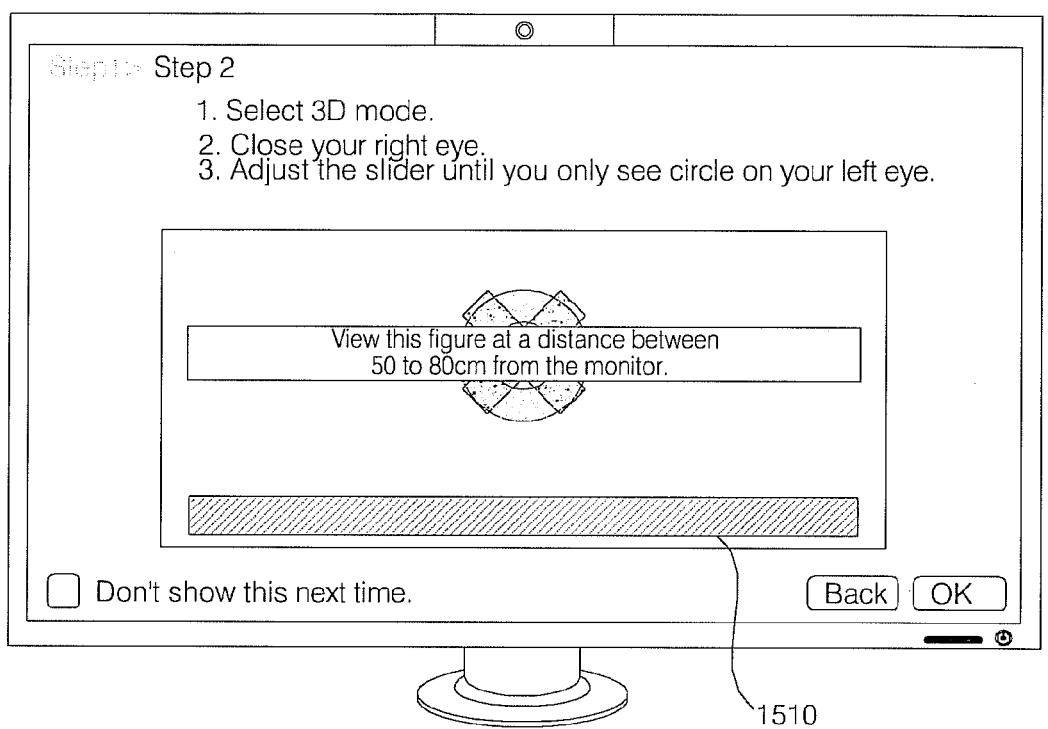

On the other hand, when the distance between the display 180 of the image display apparatus 100 and the user 700 is out of the predetermined range, the controller 170 performs a control operation for displaying an object 1410 instructing the user 700 to be located within the optimal viewing distance range as shown in FIG. 14.

When the distance between the display 180 of the image display apparatus 100 and the user 700 is out of the predetermined range, the controller 170 may also perform a control operation for displaying the movement amount object 1510 in an inactive state. This prevents movement input from being performed.

FIG. 16 illustrates an example in which multi-view images are displayed such that they move as the user moves.

As shown in FIG. 16, when the user 700 is located at a first position, a left-eye image L, a right-eye image R, a left-eye image L, and a right-eye image R may be sequentially arranged repeatedly and, when the user 700 moves to a second position to the right, a right-eye image R, a left-eye image L, a right-eye image R, and a left-eye image L may be sequentially arranged repeatedly.

An image of the user may be captured and the position of the user may be determined through the captured image of the user as shown in FIG. 9. Specifically, the position of the user may be determined using the number of pixels between the eyes of the user in the captured image.

In addition, the controller 170 determines the positions of the left-eye images L and the right-eye images R according to the determined position of the user such that the left-eye images L are viewed by the left eye 710 of the user and the right-eye images R are viewed by the right eye 720 of the user and displays the left-eye images L and the right-eye images R on the display 180 at the determined positions. Here, the left-eye images L and the right-eye images R may be displayed repeatedly.

This method is referred to as a head tracking method. That is, in the head tracking method, movement of the user is determined based on a captured image of the user and the positions of a left-eye image and a right-eye image to be displayed are determined according to the determined position of the user. This allows a left-eye image L of a 3D image that has passed through the filter unit 195 to be viewed by the left eye 710 of the user and a right-eye image R of the 3D image to be viewed by the right eye 720 of the user.

The 3D calibration mode may be performed after the position of the user is determined using head tracking.

For example, when the display 180 and the filter unit 195 which is spaced from the display 180 by a predetermined distance are laminated, a lamination error, which exceeds an allowed error range, may occur. If the lamination error is greater than the allowable error range, a left-eye image and right-eye image may fail to correctly match the left eye and the right eye of the user, respectively, due to the lamination error even though the positions of a left-eye image and a right-eye image to be displayed are changed after determining the position of the user using the head tracking technique.

Figure 17:
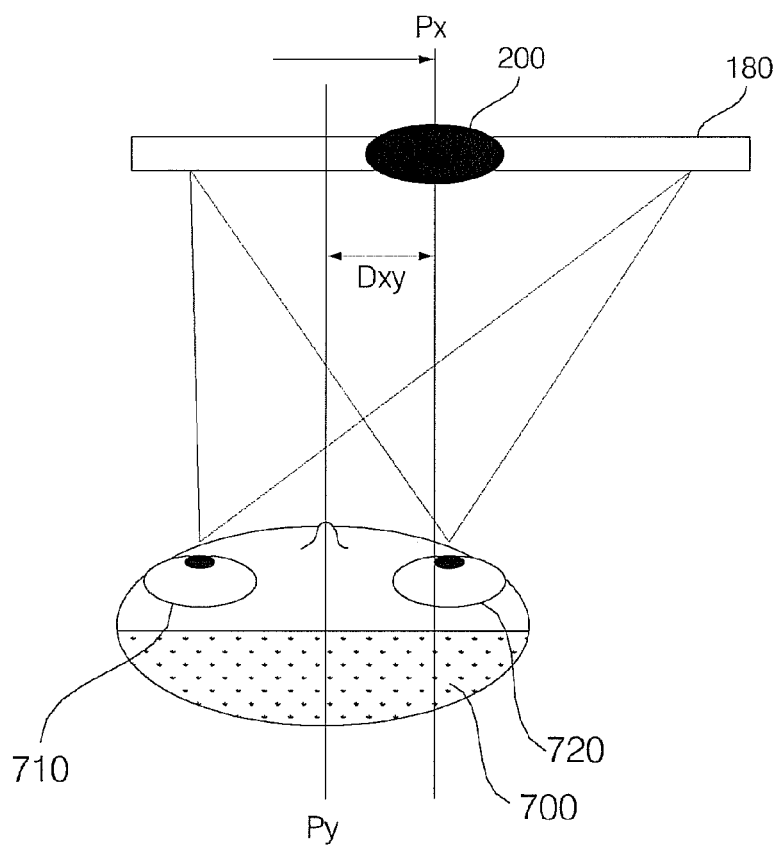

When the center of a portion, in which an image for the left eye 710 of the user 700 is viewed, in a region in which a stereoscopic image is viewed and a portion in which an image for the right eye 720 is viewed in the region is referred to as a central position Py of the viewing range and the position of the image capture unit 200 is referred to as a position Px of the capture unit, the positions Py and Px may have a difference therebetween since the central position Py of the viewing range is moved due to a lamination error occurring when the display 180 and the filter unit 195 are laminated as shown in FIG. 17. Therefore, the central position Py of the viewing range needs to be corrected from the center of the image capture unit 200.

In this case, display correction objects displayed on the screen may be rearranged and displayed after moving the reference coordinates for image arrangement according to the movement amount of the movement input according to the 3D calibration mode, thereby allowing the user to view optimal 3D images. This improves user convenience.

Of course, without using the head tracking technique, i.e., without determining the position of the user through image capture of the user, the left-eye object and the right-eye object may be directly displayed at predetermined positions in the 3D mode and then may be moved and displayed according to user movement input, thereby allowing the user to view optimal 3D images. This improves user convenience.

As is apparent from the above description, an image display apparatus and a method for controlling the same according to the embodiments of the present invention have a variety of advantages. For example, in the image display apparatus which employs an autostereoscopic 3D scheme, at least one of a left-eye object or a right-eye object may be displayed and then at least one pixel of the displayed left-eye object may be changed to a pixel of the right-eye object or at least one pixel of the displayed right-eye object may be changed to a pixel of the left-eye object and the changed pixel may be displayed according to a pixel arrangement movement amount of at least one of the left-eye object or the right-eye object. This allows the user to view optimal 3D images according to the position of the user, thereby improving user convenience.

In addition, an object, which instructs the user to perform movement input until a corresponding one of the left-eye object or the right-eye object is viewed, is displayed, thereby allowing the user to easily achieve optimal 3D image viewing.

Further, it is possible to allow the user to view optimal 3D images even when there is an error in arrangement of the display and the filter unit.

It is also possible to allow the user to view 3D images even when the position of the user changes.

The image display apparatus and the method for operating the same according to the present invention are not limited in their applications to the configurations and methods of the embodiments described above and all or some of the embodiments may be selectively combined to implement various modifications.

The method for operating an image display device according to the present invention can be embodied as processor readable code stored on a processor readable medium provided in the image display device. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves as signals transmitted over the Internet. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for operating an image display apparatus, the method comprising:
    displaying at least one of a left-eye object or a right-eye object when the image display apparatus has entered a 3-dimensional (3D) mode;
    displaying a movement amount object indicating the amount of movement of pixel arrangement of the at least one of the left-eye object or the right-eye object;
    receiving a pixel arrangement movement amount input through the movement amount object;
    changing at least one pixel of the displayed left-eye object to a pixel of the right-eye object and displaying the changed pixel or changing at least one pixel of the displayed right-eye object to a pixel of the left-eye object and displaying the changed pixel according to the pixel arrangement movement amount input, and
    when a distance between the user and the image display apparatus is out of the predetermined range, displaying an object instructing a user to be located within a predetermined range or displaying the movement amount object in an inactive state.

2. The method according to claim 1, further comprising displaying an object instructing a user to perform the pixel arrangement movement input until one of the left-eye object or the right-eye object is viewed by a corresponding one of a left eye or a right eye of the user.

3. The method according to claim 1, wherein at least one of a color or a shape of the left-eye object is different from a corresponding one of the right-eye object when the left-eye object and the right-eye object are simultaneously displayed.

4. The method according to claim 1, wherein the pixel arrangement movement input is performed according to movement of a control bar in the movement amount object.

5. The method according to claim 1, further comprising:
    acquiring a captured image of a user; and
    determining an arrangement position of the left-eye object or the right-eye object based on the captured image,
    wherein the left-eye object or the right-eye object is displayed at the determined position.

6. The method according to claim 1, further comprising:
    acquiring a captured image of a user; and
    calculating a distance between the user and the image display apparatus based on the captured image.

7. A method for operating an image display apparatus, the method comprising:
    displaying at least one of a left-eye object or a right-eye object when the image display apparatus has entered a 3-dimensional (3D) mode;
    receiving a movement input for moving an image arrangement reference coordinate of at least one of the left-eye object or the right-eye object;
    rearranging and displaying the at least one of the left-eye object or the right-eye object according to a movement amount of the movement input, and
    when a distance between the user and the image display apparatus is out of the predetermined range, displaying an object instructing a user to be located within a predetermined range.

8. The method according to claim 7, wherein rearranging and displaying the at least one of the left-eye object or the right-eye object includes changing at least one pixel representing the left-eye object to a pixel representing the right-eye object or changing at least one pixel representing the right-eye object to a pixel representing the left-eye object and displaying the changed pixel according to the movement amount of the movement input.

9. An image display apparatus comprising:
    a display to display at least one of a left-eye object or a right-eye object when the image display apparatus has entered a 3-dimensional (3D) mode and to display a movement amount object indicating the amount of movement of pixel arrangement of the at least one of the left-eye object or the right-eye object;
    a user interface unit to receive a pixel arrangement movement amount input through the movement amount object; and
    a controller to perform a control operation for changing at least one pixel representing the left-eye object to a pixel representing the right-eye object or changing at least one pixel representing the right-eye object to a pixel representing the left-eye object and displaying the changed pixel according to the pixel arrangement movement amount input,
    wherein when a distance between the user and the image display apparatus is out of the predetermined range, the controller performs a control operation for displaying an object instructing a user to be located within a predetermined range, or for displaying the movement amount object in an inactive state when the distance between a user and the image display apparatus is out of the predetermined range.

10. The image display apparatus according to claim 9, wherein the display further displays an object instructing a user to perform the pixel arrangement movement input until one of the left-eye object or the right-eye object is viewed by a corresponding one of a left eye or a right eye of the user.

11. The image display apparatus according to claim 9, wherein at least one of a color or a shape of the left-eye object is different from a corresponding one of the right-eye object when the left-eye object and the right-eye object are simultaneously displayed.

12. The image display apparatus according to claim 9, further comprising an external device interface unit to receive a captured image of a user,
wherein the controller determines an arrangement position of the left-eye object or the right-eye object based on the captured image and performs a control operation for displaying at least one of the left-eye object or the right-eye object according to the determined position.

13. The image display apparatus according to claim 9, wherein the controller performs a control operation for calculating a distance between the user and the image display apparatus based on a captured image of the user.

14. The image display apparatus according to claim 9, further comprising an image capture unit to acquire an image of a user,
wherein the controller determines an arrangement position of the left-eye object or the right-eye object based on the captured image and performs a control operation for displaying at least one of the left-eye object or the right-eye object according to the determined position.

15. The image display apparatus according to claim 9, further comprising a filter unit that is arranged such that the filter unit is spaced from the display and changes light propagation direction according to a voltage applied to the filter unit.

16. The image display apparatus according to claim 15, wherein the filter unit includes:
a first plate and a second plate which are arranged such that the first plate and the second plate are spaced from each other and to which voltage is applied;
liquid crystal arranged between the first plate and the second plate; and
a first layer and a second layer that are arranged between the first plate and the second plate and that surrounds the liquid crystal.

* * * * *